(12) United States Patent
Neumann et al.

(10) Patent No.: US 11,874,190 B2
(45) Date of Patent: Jan. 16, 2024

(54) SIMULATION DEVICE FOR THE SCREW JOINT SIMULATION OF A NUTRUNNER

(71) Applicant: KISTLER HOLDING AG, Winterthur (CH)

(72) Inventors: Gerald Neumann, Hueckeswagen (DE); Siegfried Fischer, Wermelskirchen (DE)

(73) Assignee: KISTLER HOLDING AG, Winterthur (CH)

( * ) Notice: Subject to any disclaimer, the term of this patent is extended or adjusted under 35 U.S.C. 154(b) by 0 days.

(21) Appl. No.: 17/851,708

(22) Filed: Jun. 28, 2022

(65) Prior Publication Data

US 2023/0008136 A1 Jan. 12, 2023

(30) Foreign Application Priority Data

Jul. 7, 2021 (EP) .................................... 21184325

(51) Int. Cl.
G01L 25/00 (2006.01)

(52) U.S. Cl.
CPC ................................. G01L 25/003 (2013.01)

(58) Field of Classification Search
CPC ........ G01L 25/003; G01L 5/24; G01M 13/00; G01D 21/02
See application file for complete search history.

(56) References Cited

U.S. PATENT DOCUMENTS

| | | | |
|---|---|---|---|
| 5,886,246 A | 3/1999 | Bareggi et al. | |
| 6,718,831 B2 * | 4/2004 | Chiapuzzi | G01L 25/003 73/761 |
| 9,702,797 B2 * | 7/2017 | Yang | G01N 3/22 |
| 10,317,304 B2 * | 6/2019 | Boccellato | B25H 1/005 |
| 10,345,183 B2 * | 7/2019 | Sartori | G01L 5/24 |
| 2008/0314162 A1 | 12/2008 | Inoue | |
| 2017/0356821 A1 * | 12/2017 | Sartori | G01L 25/003 |
| 2017/0363500 A1 * | 12/2017 | Boccellato | G01N 3/22 |
| 2021/0278301 A1 * | 9/2021 | Cabrel | G08C 17/00 |

(Continued)

FOREIGN PATENT DOCUMENTS

| | | |
|---|---|---|
| DE | 29622317 | 11/1997 |
| EP | 0 849 049 A1 | 6/1998 |
| JP | 2000097791 A | 4/2000 |

(Continued)

OTHER PUBLICATIONS

EPO Search Report, dated Dec. 17, 2021, 10 pages.
The foreign Office Action in JP with English translation for JP application No. 2022-101295, Sep. 19, 2023, 6 pages.

*Primary Examiner* — Freddie Kirkland, III
(74) *Attorney, Agent, or Firm* — Dority & Manning, P.A.

(57) ABSTRACT

A simulation device for the screw joint simulation of a nutrunner includes a test connecting element rigidly connected to a brake unit. The nutrunner can be coupled to the test connecting element and activated to exert a torque that rotates the test connecting element about an axis of rotation. Activation of the brake unit brakes the test connecting element. A torque transducer includes a rotational angle transducer for measuring a rotational angle by which the test connecting element rotates about the rotation axis. The simulation device includes a zero mark, and the brake unit can be adjusted to a zero angle with respect to the zero mark.

14 Claims, 7 Drawing Sheets

(56) References Cited

U.S. PATENT DOCUMENTS

2023/0017978 A1* 1/2023 Maenz ................. G01L 25/003

FOREIGN PATENT DOCUMENTS

| JP | 2005351683 A | 12/2005 |
| JP | 2009524039 A | 6/2009 |
| WO | WO2007/099626 | 9/2007 |
| WO | WO 2016/103147 A1 | 6/2016 |

* cited by examiner

SIMULATION DEVICE FOR THE SCREW JOINT SIMULATION OF A NUTRUNNER

TECHNICAL FIELD

The invention relates to a simulation device for the screw joint simulation of a nutrunner. The invention also relates to a method for carrying out the screw joint simulation of a nutrunner using the simulation device. In addition, the invention relates to a method for retrofitting a pre-existing simulation device to form the simulation device.

BACKGROUND OF THE INVENTION

According to the guideline VDI/VDE 2647 of February 2013, a nutrunner is a motor-driven screwdriving tool. The nutrunner can be activated, and the activated nutrunner continuously rotates about a rotation axis, thereby exerting a torque onto a connecting element.

The connecting element comprises a thread and is a bolt, a nut, etc. The connecting element is used to connect components. The connection is made by a clamping force between the components. The clamping force ensures that the components can be used under maximum operating forces.

Thus, the torque exerted by the activated nutrunner serves to generate the clamping force. For this purpose, the nutrunner increases the applied torque over time and/or increases the applied torque via the angle of rotation. The exerted torque increases up to a nominal torque specific for the clamping force and/or up to a nominal angle of rotation specific for the clamping force. The nominal torque and/or the nominal angle of rotation can be set on the nutrunner. In the following explanation, the nominal torque and/or the nominal angle of rotation will be referred to as the nominal value.

The nutrunner is equipped with an indicator system. As soon as the nominal value is reached, the nutrunner ceases to apply the torque. The indicator system may work according to different functional principles. Thus, a click-type torque wrench automatically interrupts the application of the torque once the nominal value is achieved. An acoustic torque wrench automatically triggers an acoustic or optical signal when the nominal value is reached. An indicating nutrunner displays the actual exerted torque and/or the actual angle of rotation on a scale or an electronic screen.

A nutrunner of the aforementioned type is used in many industrial manufacturing processes. In order to ensure that the nutrunner actually achieves the set nominal value, the performance of the nutrunner is tested at regular intervals.

For this purpose, the guideline VDI/VDE 2647 of February 2013 specifies what should be tested and how. The nutrunner performance test is referred to as screw joint simulation. The screw joint simulation is carried out using a simulation device comprising a brake unit and a test connecting element. The test connecting element is able to rotate about an axis of rotation. The brake unit and the test connecting element are rigidly coupled to each other. The nutrunner is coupled to the simulation device via the test connecting element.

The nutrunner coupled to the simulation device is activated and exerts a torque onto the test connecting element. The applied torque causes the test connecting element to start rotating about the axis of rotation. The brake unit is activated and brakes the test connecting element.

The simulation device further comprises a measuring unit comprising a torque transducer and a rotational angle transducer. The torque transducer measures the rotational torque and the rotational angle transducer measures the angle of rotation by which the test connecting element rotates about the axis of rotation. The measuring unit is arranged between the brake unit and the test connecting element.

The time course of the measured torque with respect to the measured angle of rotation is graphically represented as a torque rate. In order to obtain statistical significance, the screw joint simulation is carried out a plurality of times. The torque rates obtained from these multiple screw joint simulations are graphically represented superimposed on each other. For each torque rate, a maximum measured torque and a maximum measured rotational angle that corresponds to the maximum measured torque are determined. The arithmetic mean of the maximum measured torques is referred to as the mean torque. The arithmetic mean of the maximum measured angle of rotation is referred to as the mean angle of rotation. In addition, the screw joint simulation is repeated for different set nominal torques as well as for torque rates of different amounts.

According to guideline VDI/VDE 2647 of February 2013, the mass moment of inertia of the rotating parts of the simulation device should have no significant impact on the mean torque. The rotating parts of the simulation device are a rotor of the brake unit, a measuring disc of the measuring unit, the test connecting means, etc. For a screw joint simulation with low torque rate, a difference of the maximum measured angle of rotation of ±15% with respect to the mean angle of rotation is permissible. Furthermore, for a screw joint simulation with high torque rate, a difference of the maximum measured angle of rotation of ±5% with respect to the mean angle of rotation is permissible.

This means that the requirements concerning the concentricity of the rotating parts of the simulation device are very high. More specifically, the rotating unbalance of the rotor of the brake unit and of the measuring disc of the measuring unit with respect to the axis of rotation must be minimized. These high requirements with respect to concentricity lead to high production and acquisition costs of the simulation device.

OBJECTS AND SUMMARY OF THE INVENTION

It is a first object of the present invention to provide a cost-effective simulation device for the screw joint simulation of a nutrunner, which simulation device complies with the requirements of the guideline VDI/VDE 2647 of February 2013 and keeps the permissible deviation of the maximum measured angle of rotation with respect to the mean angle of rotation within those required for the screw joint simulation.

It is a further object of the invention to propose a method for carrying out the screw joint simulation of a nutrunner using a simulation device, which simulation device complies with the requirements of the guideline VDI/VDE 2647 of February 2013 and keeps the permissible deviation of the maximum measured angle of rotation with respect to the mean angle of rotation within those required for the screw joint simulation, and which method can be carried out in an easy and quick manner.

Furthermore, it is an additional object of the invention to provide a method for retrofitting a pre-existing simulation device for the screw joint simulation of a nutrunner, which retrofitted simulation device complies with the requirements of the guideline VDI/VDE 2647 of February 2013 and keeps the permissible deviation of the maximum measured angle of rotation with respect to the mean angle of rotation within those required for the screw joint simulation.

These objects and others have been achieved by the features described hereinafter.

The invention relates to a simulation device for the screw joint simulation of a nutrunner; comprising a test connecting element and a brake unit, said test connecting element being rigidly connected to the brake unit; which nutrunner can be coupled to the test connecting element; which nutrunner can be activated; wherein the activated nutrunner exerts a torque onto the test connecting element coupled thereto; which exerted torque rotates the test connecting element about an axis of rotation; wherein said brake unit can be activated; which activated brake unit brakes the test connecting element that rotates about the axis of rotation; comprising a torque transducer for measuring the exerted torque; and comprising an rotational angle transducer for measuring an angle of rotation by which the test connecting element rotates about the axis of rotation; wherein said simulation device comprises a zero mark; and wherein said brake unit can be adjusted to a zero angle with respect to the zero mark.

Further embodiments of the subject matter of the simulation device are described hereinafter.

The invention also relates to a method for carrying out the screw joint simulation of a nutrunner using the simulation device wherein, in a first step of the method, the brake unit is adjusted to a zero angle with respect to the zero mark; wherein, in a second step of the method, the nutrunner is coupled to the test connecting element; and wherein, in a third step of the method, the screw joint simulation is started in an angle-synchronized manner starting from the zero angle.

The inventors have surprisingly found that it is possible to meet the requirements of the guideline VDI/VDE 2647 of February 2013 concerning the permissible deviation of the measured angle of rotation with respect to the mean angle of rotation when the screw joint simulation is consistently started from a zero angle that is adjusted with respect to a zero mark. In this way, the rotating parts of the simulation device are always in the same defined starting position of the rotational movement and, therefore, any rotational unbalance of the rotating parts of the simulation device is angularly synchronized. The screw joint simulation is repeated a plurality of times and in this way the rotational unbalance occurs in an angle-synchronized manner with respect to the zero angle. Furthermore, in a subsequent graphical superimposition of torque rates of the screw joint simulation that has been carried out a plurality of times, the deviations of the maximum measured angles of rotation from the mean angle of rotation which are caused by this rotational unbalance are also displayed in an angle-synchronized manner. To determine the zero mark and to adjust the brake unit to a zero angle with respect to the zero mark is inexpensive and, in addition, it is possible to carry out the process in a simple and quick manner.

Furthermore, the invention relates to a method for retrofitting a pre-existing simulation device to form the simulation device wherein said pre-existing simulation device comprises a pre-existing rotational angle transducer and a pre-existing measuring disc without a zero mark; wherein in a first step of the method the pre-existing measuring disc is removed; wherein, in a second step of the method, a measuring disc having a zero mark is provided; wherein, in a third step of the method, the measuring disc provided is installed in place of the pre-existing measuring disc; and wherein, in a fourth step of the method, an orientation of the pre-existing rotational angle transducer with respect to the zero mark is defined as the zero angle.

Alternatively, the invention further relates to a method for retrofitting a pre-existing simulation device for the screw joint simulation of a nutrunner to form the simulation device wherein said pre-existing simulation device comprises a pre-existing rotational angle transducer and a pre-existing measuring disc having angle marks but without a zero mark; wherein, in an alternative first step of the method, one of the angle marks of the pre-existing measuring disc is defined as the zero mark; and wherein, in a fourth step of the method, an orientation of the pre-existing rotational angle transducer with respect to the zero mark is defined as the zero angle

BRIEF DESCRIPTION OF THE SEVERAL VIEWS OF EXEMPLARY DRAWINGS

In the following, the invention will be explained in more detail by way of example with reference to the figures in which:

FIG. 1 shows a schematic representation of the simulation device 1 for the screw joint simulation of a nutrunner 2;

FIG. 2 shows a view of a portion of a first embodiment of a measuring unit 12 of the simulation device 1 according to FIG. 1 without angularly synchronized positioning of a zero mark 12.12 with respect to a zero angle 12.22;

FIG. 3 shows a view of a portion of the first embodiment of the measuring unit 12 according to FIG. 2 with angularly synchronized positioning of the zero mark 12.12 with respect to the zero angle 12.22;

FIG. 4 shows a view of a portion of a second embodiment of a measuring unit 12 of the simulation device 1 according to FIG. 1 without angularly synchronized positioning of a zero mark 12.12 with respect to a zero angle 12.22;

FIG. 5 shows a view of a portion of the second embodiment of the measuring unit 12 according to FIG. 4 with angularly synchronized positioning of the zero mark 12.12 with respect to the zero angle 12.22;

DETAILED DESCRIPTION OF EXEMPLARY EMBODIMENTS OF THE INVENTION

Figure 1:
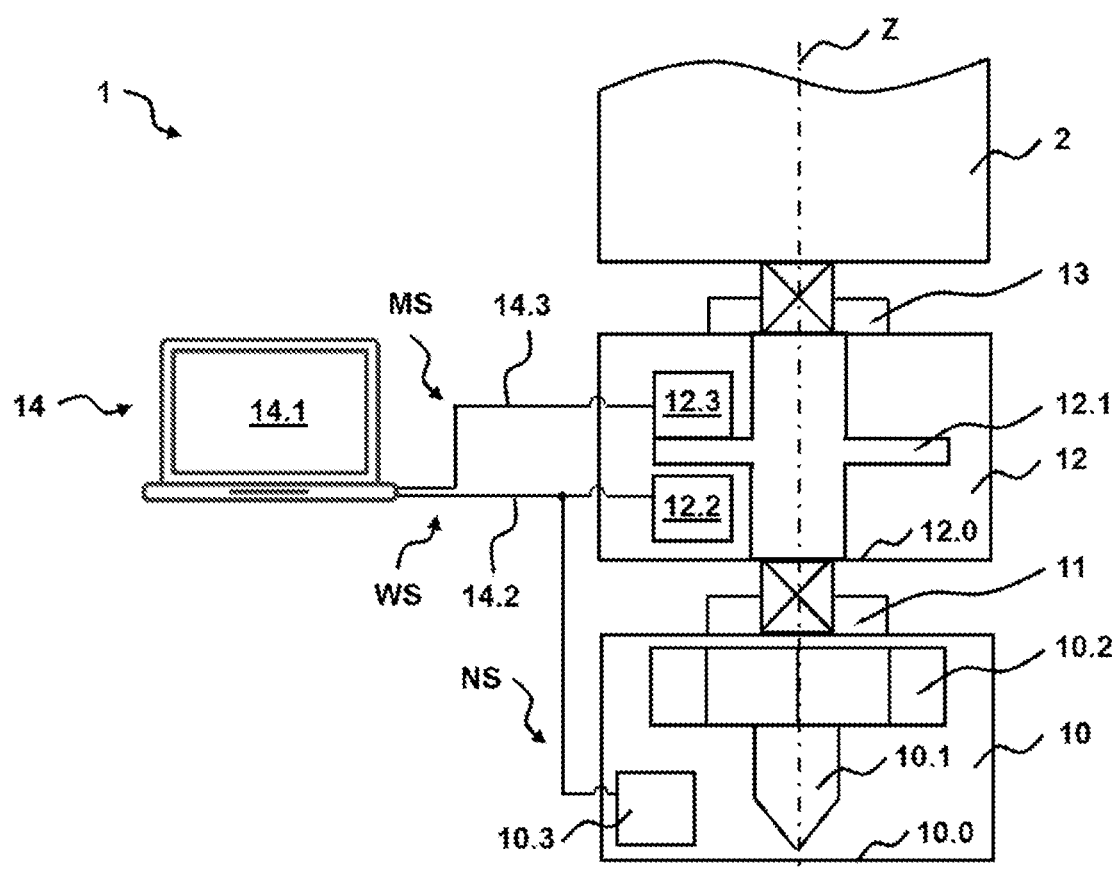

FIG. 1 shows a schematic representation of a simulation device 1 for the screw joint simulation of a nutrunner 2.

According to the guideline VDI/VDE 2647 of February 2013, the nutrunner 2 is a motor-driven screwdriving tool. The nutrunner can be activated and the activated nutrunner continuously rotates about an axis of rotation Z and exerts a torque.

Nutrunner 2 increases the exerted torque over time and/or increases the exerted torque via the angle of rotation. The increase in exerted torque takes place up to a nominal torque and/or up to a nominal angle of rotation. The nominal torque and/or the nominal angle of rotation can be adjusted on the nutrunner 2. In the following explanation, the nominal torque and/or the nominal angle of rotation is/are also referred to as the nominal value.

The nutrunner 2 is equipped with an indicator system. As soon as the nominal value is reached, nutrunner 2 stops applying the torque. The indicator system may operate according to different functional principles. The nutrunner 2 may be a click-type torque wrench which automatically releases itself when the nominal torque is reached. The nutrunner 2 may be an acoustic torque wrench which automatically triggers an acoustic or optical signal when the nominal torque is reached. The nutrunner 2 may be an indicating nutrunner which indicates the applied torque on a scale or an electronic screen.

The simulation device 1 comprises a test connecting element 13. Nutrunner 2 is rigidly coupled to the simulation device 1 via the test connecting element 13. The test connecting element 13 is configured so that the coupling of the nutrunner 2 and the simulation device 1 that is effected by the test connecting element 13 is releasable at the option of the user of the simulation device 1.

The simulation device 1 comprises a measuring unit 12. The measuring unit 12 is arranged in a measuring unit housing 12.0 that desirably is hollow-cylindrical in shape and made of robust metal. The measuring unit housing 12.0 defines an interior that includes a hollow space. A measuring disc 12.1 is arranged in the hollow space.

As schematically shown in FIGS. 2-5, the measuring disc 12.1 desirably is a cylindrical body that includes an annular skirt extending radially from a central shaft and can be made of robust metal to withstand a particularly harsh working environment. However, the measuring disc 12.1 desirably is made of glass or polyester such as polyethylene terephthalate (PET). The test connecting element 13 is rigidly connected to the measuring disc 12.1 so that the two components 12.1, 13 become integrated as if unitary. For a measuring disc 12.1 made of metal, the connecting element 13 desirably is either eroded in the central shaft or milled in the central shaft. For a measuring disc 12.1 made of glass or polyester, the connecting element is glued to the central shaft such as with epoxy resin. The nutrunner 2 coupled to the test connecting element 13 is activated and exerts a torque onto the test connecting element 13. The test connecting element 13 and the measuring disc 12.1 that is rigidly connected thereto begin to rotate about the axis of rotation Z due to the torque exerted by the nutrunner 2.

As schematically shown in FIGS. 2-5, the annular skirt portion of the measuring disc 12.1 is at least partially defined by a measuring surface 12.10 wherein the measuring surface 12.10 lies in a plane the normal of which is parallel to the axis of rotation Z that lies along the central shaft. The measuring disc 12.1 comprises angle marks 12.11, said angle marks 12.11 being arranged on the measuring surface 12.10 and aligned along radii that originate at the axis of rotation Z.

Figure 2:
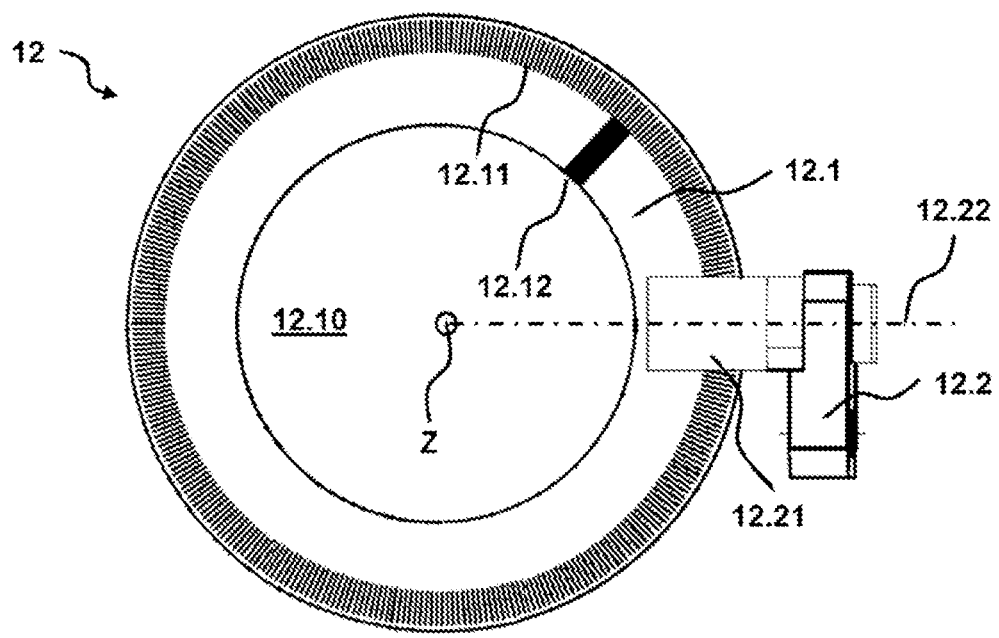
Figure 3:
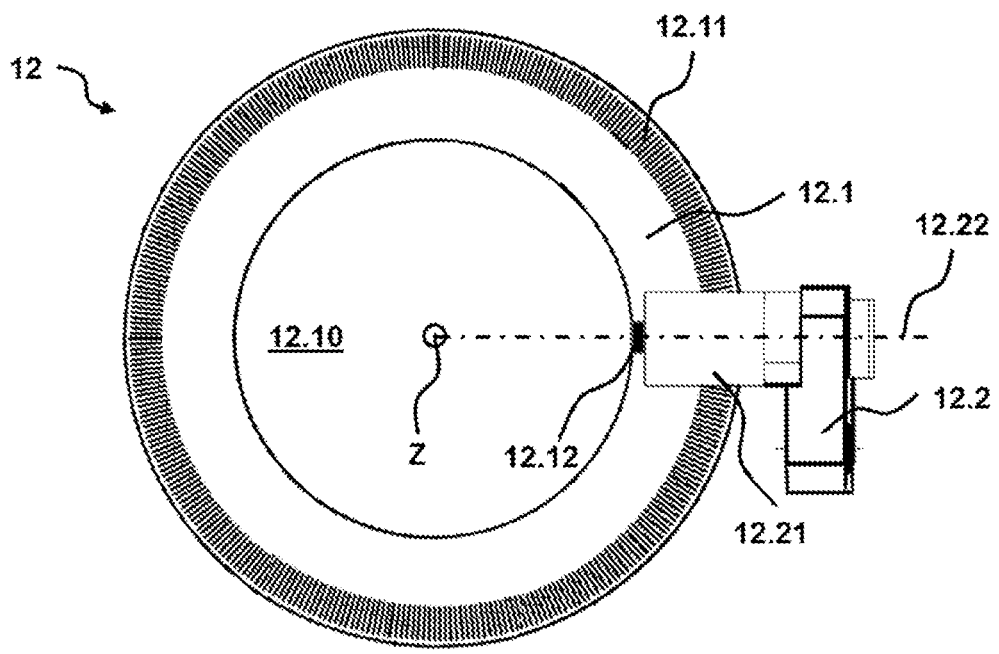

In the first embodiment of the measuring disc 12.1 as shown in FIGS. 2 and 3, the angle marks 12.11 are circumferentially alternating light and dark dashes. The dark dashes of the angle marks 12.11 desirably are printed onto the measuring surface 12.10 by screen printing or pad printing. The light and dark dashes are arranged in a first area on the measuring surface 12.10, said first area having a constant radial distance from the axis of rotation Z. The light and dark dashes are arranged at an equal distance to each other as seen in the circumferential direction of rotation. The light and dark dashes are incremental code values. The incremental code values designate angles of rotation during the rotational movement of the measuring disc 12.1 about the rotation axis Z. The designation of the angle of rotation by the incremental code values is not clearly defined during rotation of the measuring disc 12.1 about the axis of rotation Z.

Figure 4:
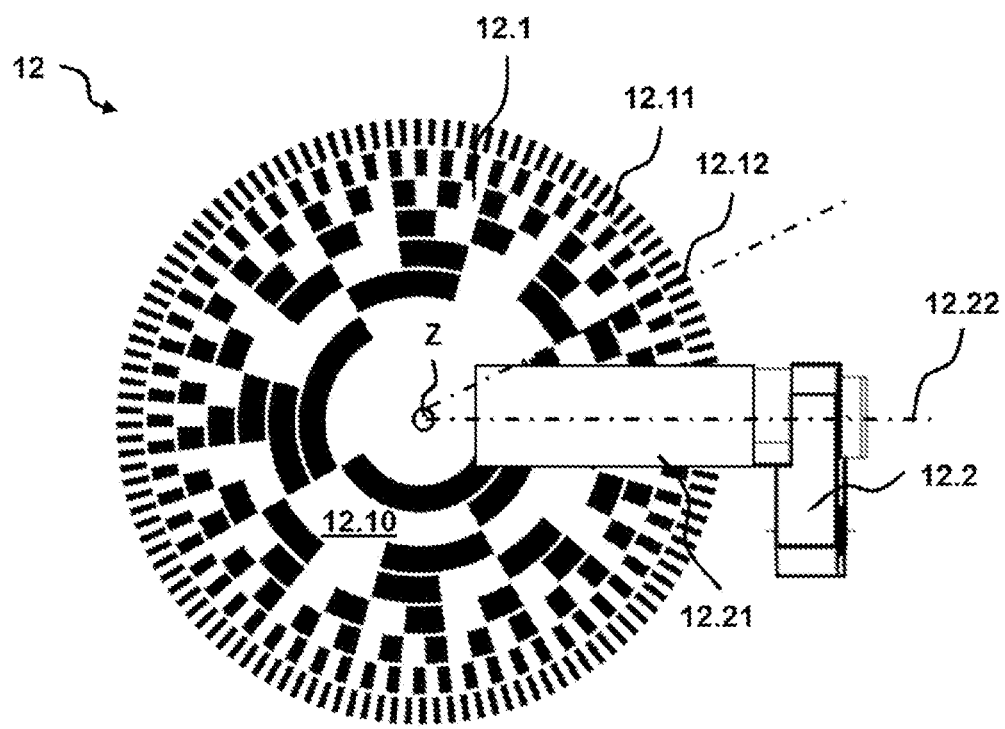
Figure 5:
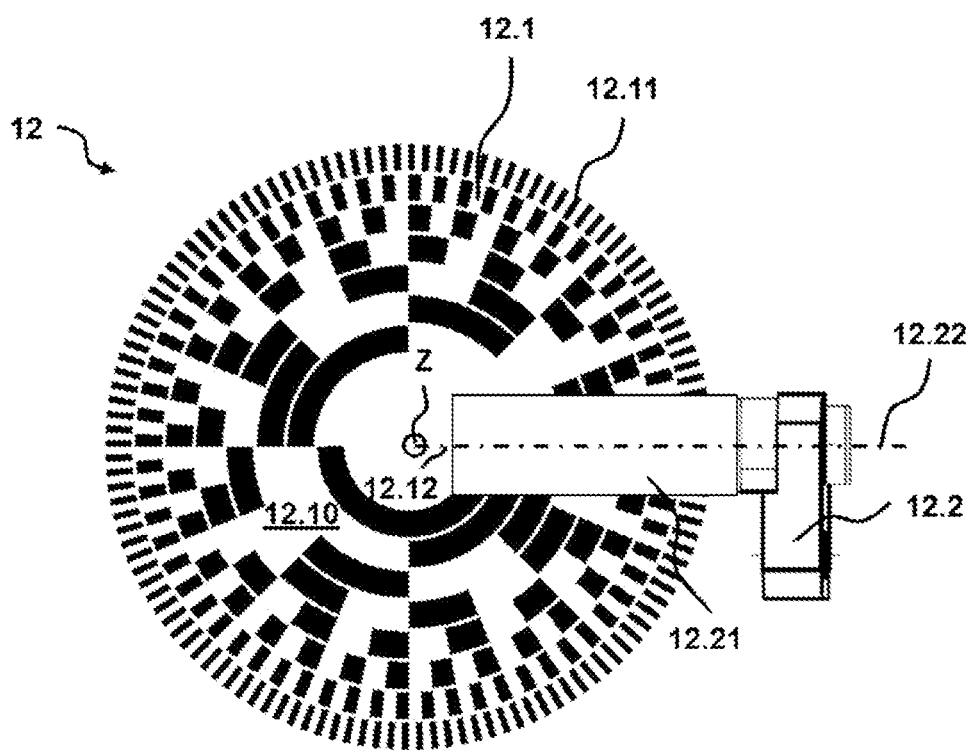

In the second embodiment of the measuring disc 12.1 as shown in FIGS. 4 and 5, the angle marks 12.11 are a Gray code. The Gray code is substantially arranged on the entire measuring surface 12.10. The Gray code comprises a plurality of light and dark code values. The Gray code of the angle marks 12.11 desirably are printed onto the measuring surface 12.10 by screen printing or pad printing. As seen in the circumferential direction of rotation, said light and dark code values are arranged side by side to each other. The light and dark code values are absolute code values, i.e. each absolute code value has a clearly defined value. The absolute code values unambiguously designate the angle of rotation during rotation of the measuring disc 12.1 about the axis of rotation Z.

Simulation device 1 comprises a rotational angle transducer 12.2. The rotational angle transducer 12.2 is fixedly attached to the measuring unit housing 12.0. The rotational angle transducer 12.2 is configured to measure the angle of rotation by which the measuring disc 12.1 rotates about the axis of rotation Z. As schematically shown in FIGS. 2-5, the rotational angle transducer 12.2 is arranged above the measuring surface 12.10 of the measuring disc 12.1. The rotational angle transducer 12.2 comprises a sensor element 12.21. The sensor element 12.21 is configured to detect angle marks 12.11. Preferably, the rotational angle transducer 12.2 is an optical rotational angle transducer comprising an optical sensor element, wherein the optical rotational angle transducer emits light onto the angle marks 12.11 and by means of the optical sensor element detects emitted light that has been reflected by the angle marks 12.11. Thus, when the angle marks 12.11 rotate about the rotation axis Z, the section of the angle marks 12.11 covered by the optical sensor element also changes so that different ones of the angle marks 12.11 are detected during rotation of the measuring disc 12.1.

In the first embodiment of said angle marks 12.11 as shown in FIGS. 2 and 3, the rotational angle transducer 12.2 counts the number of incremental code values detected by said sensor element 12.21 after the section of the angle marks 12.11 has changed and generates a corresponding rotational angle signal WS.

In the second embodiment of the angle marks 12.11 as shown in FIGS. 4 and 5, the rotational angle transducer 12.2 identifies the absolute code value detected by the sensor element 12.21 after the section of the angle marks 12.11 has changed and generates a corresponding rotational angle signal WS.

Preferably, the rotational angle transducer 12.2 measures the angle of rotation by which said measuring disc 12.1 rotates about the axis of rotation Z with an angular resolution of less than/equal to 1°. The rotational angle transducer 12.2 generates a rotational angle signal WS for the angle of rotation measured. As schematically shown in FIG. 1, the rotational angle signal WS is transmitted via a rotational angle signal line 14.2. Preferably, the rotational angle transducer 12.2 measures the angle of rotation with a measuring frequency of greater than/equal to 2000 Hz.

Instead of using an optical rotational angle transducer comprising an optical sensor element, those skilled in the art knowing the present invention may also use a rotational angle transducer that operates according to a different functional principle, such as a magnetic rotational angle transducer comprising a magnetic sensor element, a capacitive rotational angle transducer comprising a capacitive sensor element, and the like.

As schematically shown in FIG. 1, the simulation device 1 comprises a torque transducer 12.3. The torque transducer 12.3 is attached to the measuring disc 12.1. The torque transducer 12.3 is configured to measure the force at a perpendicular distance from the axis of rotation Z along a line of force to obtain the torque experienced by the measuring disc 12.1 and accordingly the torque being applied by the nutrunner 2. Preferably, the torque transducer 12.3 comprises several strain gauges. The strain gauges are attached to the measuring disc 12.1 with respect to the line of force in such a way that they are stretched and compressed under the effect of the force. This stretching and compression causes an electrical resistance of the strain gauges to change. The strain gauges are electrically connected in a bridge circuit. The change in electrical resistance produces an electrical voltage signal in the bridge circuit of the strain gauges, said electrical voltage signal being proportional to the magnitude of the torque. As schematically shown in FIG. 1, the electrical voltage signal thus generated by the torque transducer 12.3 is transmitted via a torque signal line 14.3 as the torque signal MS. Preferably, the torque transducer 12.3 measures the torque in various measuring ranges such as 0.4 to 2 Nm, 2 to 10 Nm, 10 to 50 Nm, 50 to 250 Nm, 100 to 500 Nm, 400 to 2000 Nm, 1200 to 6000 Nm, etc. Preferably, the torque transducer 12.3 measures the torque at a measuring frequency of 2000 Hz or more.

As schematically shown in FIG. 1, the simulation device 1 comprises a brake unit 10. Said brake unit 10 desirably is arranged in a hollow-cylindrical brake unit housing 10.0 made of robust metal. The brake unit housing 10.0 defines an interior that includes a hollow space. A braking element 10.1 and a rotor 10.2 mounted rigidly on one end of the braking element 10.1 are arranged in the hollow space.

As schematically shown in FIG. 1, the simulation device 1 comprises a coupling element 11. Said coupling element 11 is arranged between the rotor 10.2 and the measuring unit 12 as viewed along the axis of rotation Z. The coupling element 11 is rigidly connected to both the rotor 10.2 of the braking element 10.1 and the measuring disc 12.1. The coupling element 11 couples the rotor 10.2 of the braking element 10.1 to the measuring disc 12.1.

Braking element 10.1 is preferably operated in a hydraulic or electric manner. The braking element 10.1 may be activated and the activated braking element 10.1 converts hydraulic or electric energy into force. The rotor 10.2 desirably is a cylindrical body made of metal and is rigidly connected to said braking element 10.1. The force generated by the braking element 10.1 acts onto the rotor 10.2 and rotates the rotor 10.2 about the axis of rotation Z. The direction of rotation of the rotor 10.2 about the axis of rotation Z is opposite to the direction of rotation of the test connecting element 13 about the axis of rotation Z. As a result, the activated braking element 10.1 brakes the test connecting element 13.

As schematically shown in FIG. 1, the brake unit 10 further comprises a control and regulating unit 10.3. Said control and regulating unit 10.3 activates and deactivates the braking element 10.1. However, the control and regulating unit 10.3 also regulates and controls the magnitude and the duration of the force generated as well as the velocity, acceleration and duration of the rotational movement of the rotor 10.2. Preferably, the rotor 10.2 rotates with a rotational speed in a rotational speed range from 10 to 3000 rpm.

As schematically shown in FIGS. 2-5, the measuring disc 12.1 comprises a zero mark 12.12. Preferably, said zero mark 12.12 is arranged on the measuring surface 12.10.

In the first embodiment of the measuring disc 12.1 as shown in FIGS. 2 and 3, the zero mark 12.12 is a dark line. The dark line is arranged in a different area on the measuring surface 12.10 wherein said dark line has a smaller radial distance from the axis of rotation Z than the first area in which the angle marks 12.11 are arranged. Thus, the zero mark 12.12 is not part of the angle marks 12.11. Said zero mark 12.12 and the angle marks 12.11 are spatially separated from each other on the measuring surface 12.10. A measuring disc 12.1 of this type having a zero mark 12.12 and angle marks 12.11 in areas separated from each other is inexpensive. The sensor element 12.21 is configured to detect the zero mark 12.12 arranged in the different area independently of the angle marks 12.11 arranged in the first area. For the zero mark 12.12 detected by the sensor element 12.21, the rotational angle transducer 12.2 generates a zero mark signal NS. The zero mark signal NS is transmitted via the rotational angle signal line 14.2 schematically shown in FIG. 1.

In the second embodiment of the measuring disc 12.1 as shown in FIGS. 4 and 5, the zero mark 12.12 is a defined absolute code value of the Gray code of the angle marks 12.11. Thus, the zero mark 12.12 is an integral part of the angle marks 12.11. Said zero mark 12.12 and the angle marks 12.11 are not spatially separated from each other on the measuring surface 12.10. The sensor element 12.21 is configured to detect the zero mark 12.12 together with the angle marks 12.11. For the zero mark 12.12 detected by the sensor element 12.21, the rotational angle transducer 12.2 generates a zero mark signal NS. The zero mark signal NS is transmitted via the rotational angle signal line 14.2 schematically shown in FIG. 1.

The rotational angle transducer 12.2 is arranged in a defined manner at a zero angle 12.22 with respect to the zero mark 12.12. The rotational angle transducer 12.2 is fixedly attached to the simulation device 1. Advantageously, the rotational angle transducer 12.2 is fixedly attached to the measuring unit housing 12.0.

In the embodiment of the rotational angle transducer 12.2 as shown in FIGS. 2 to 5, the zero angle 12.22 designates a maximum radial extension of the rotational angle transducer 12.2 along a radial direction, which radial direction is perpendicular to the axis of rotation Z. Advantageously, the position of the zero angle 12.22 coincides with the position of the sensor element 12.21.

The zero angle 12.22 is a defined starting position of the rotational movement about the rotation axis Z for carrying out the screw joint simulation. This is because the zero mark 12.12 and the zero angle 12.22 allow for angle-synchronized positioning of the rotating parts of the simulation device 1. The rotating parts of the simulation device 1 include the braking element 10.1, the rotor 10.2, the coupling element 11, the measuring disc 12.1, the torque transducer 12.3 and the test connecting element 13. Since the rotating parts are rigidly connected to each other, an adjustment of the zero mark 12.12 of the measuring disc 12.1 to the zero angle 12.22 of the stationary rotational angle transducer 12.2 is sufficient to obtain angle-synchronized positioning of all rotating parts of the simulation device 1. FIGS. 2 and 4 show the zero mark 12.12 and the zero angle 12.22 positioned without angle synchronization. FIGS. 3 and 5 show the zero mark 12.12 and the zero angle 12.22 adjusted to an angularly synchronized position.

As schematically shown in FIG. 1, the simulation device 1 comprises an evaluation unit 14. Said evaluation unit 14 desirably comprises a processor, a data memory, a rotational angle signal line 14.2, a torque signal line 14.3 and an output device, which can take the form of a computer screen. An evaluation program 14.1 can be loaded from the data memory into the processor. The evaluation program 14.1 loaded into the processor is designed to import a rotational angle signal WS via an interface from the rotational angle signal line 14.2. The evaluation program 14.1 loaded into the processor is designed to import a torque signal MS via an interface from the torque signal line 14.3.

Figure 6:
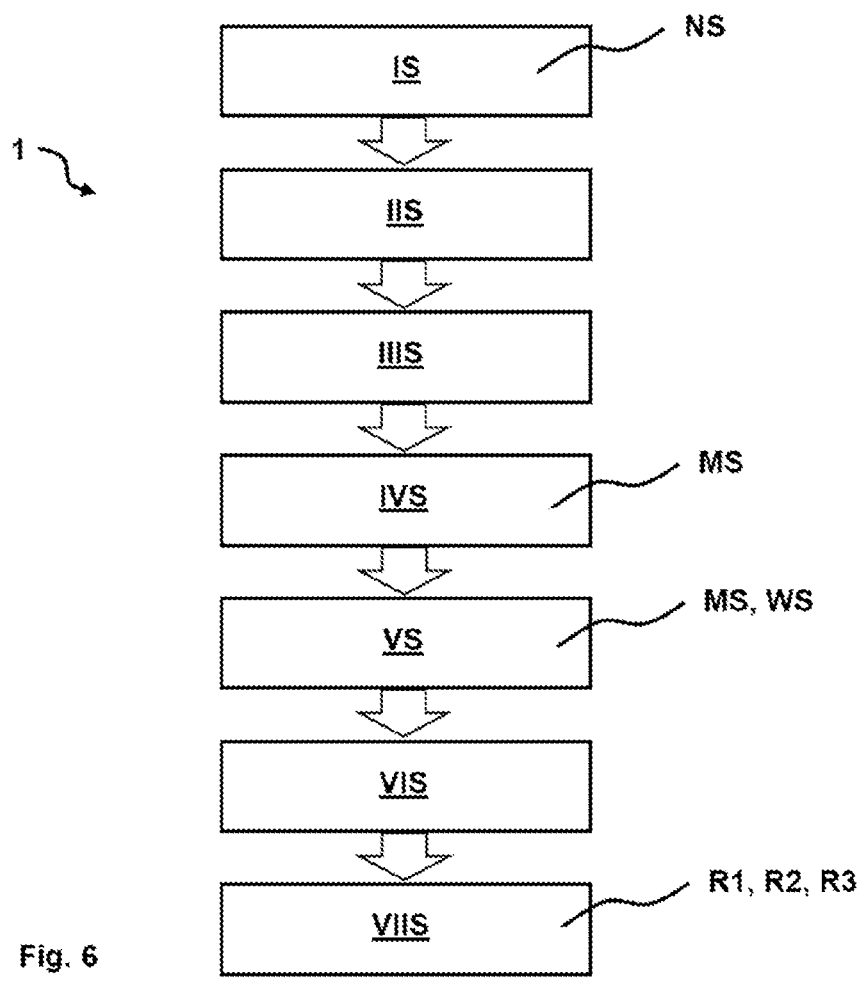
FIG. 6 shows a schematic representation of a sequence of steps IS to VIIS of the method for carrying out the screw joint simulation of a nutrunner using the simulation device 1 according to FIG. 1.

As shown in FIG. 6, the method for carrying out the screw joint simulation using the simulation device 1 desirably is performed in a plurality of steps IS to VIIS.

In a first step IS of the method schematically shown in FIG. 6, the brake unit 10 is adjusted in an angle-synchronized manner to a zero angle 12.22 with respect to the zero mark 12.12. This is illustrated in FIGS. 2 to 5. In FIGS. 2 and 4, the zero mark 12.12 and zero angle 12.22 are angularly offset from each other while in FIGS. 3 and 5 the zero mark 12.12 and zero angle 12.22 are positioned in an angle-synchronized manner. The adjustment of the zero mark 12.12 and zero angle 12.22 is effected by the braking element 10.1 schematically shown in FIG. 1. Said braking element 10.1 is activated by the control and regulating unit 10.3. The activated braking element 10.1 drives the rotor 10.2 and, thus, also the measuring disc 12.1 that is rigidly connected to the rotor 10.2 via the coupling element 11 to rotate about the axis of rotation Z. As soon as the sensor element 12.21 detects the zero mark 12.12 of the rotating measuring disc 12.1, the rotational angle transducer 12.2 generates a zero mark signal NS, said zero mark signal NS being transmitted via the rotational angle signal line 14.2 to the control and regulating unit 10.3. The control and regulating unit 10.3 receives the zero mark signal NS via an interface from the rotational angle signal line 14.2. The control and regulating unit 10.3 deactivates the braking element 10.1 upon receipt of the zero mark signal NS. Now, the zero mark 12.12 is angularly synchronized with respect to the zero angle 12.2. The simulation device 1 has now been configured for operation.

In a second step IIS of the method schematically shown in FIG. 6, a nominal torque is set on the nutrunner 2. Said nutrunner 2 is coupled to the test connecting element 13.

In a third step IIIS of the method schematically shown in FIG. 6, the screw joint simulation is started from the zero angle 12.22. For this purpose, the nutrunner 2 is activated.

Said nutrunner 2 coupled to the test connecting element 13 exerts a torque onto the test connecting element 13 and on the measuring disc 12.1 which is rigidly connected to the test connecting element 13. This torque increases with time in accordance with the increase in the angle of rotation. As a result thereof, said test connecting element 13 and measuring disc 12.1 rotate in one direction around the rotation axis Z.

Brake unit 10 is activated during the third step IIIS and brakes the test connecting element 13. For this purpose, said braking element 10.1 is activated by the control and regulating unit 10.3. The activated braking element 10.1 rotates the rotor 10.2 about the axis of rotation Z in a direction of rotation that is opposite to the direction of rotation of the test connecting element 13. Since the rotor 10.2 is rigidly connected to the measuring disc 12.1 via the coupling element 11 and since the measuring disc 12.1 is rigidly connected to the test connecting element 13, the rotational movement of the test connecting element 13 about the rotation axis Z is slowed down in this way.

In a fourth step IVS of the method schematically shown in FIG. 6, the torque measurement is initiated. For this purpose, torque transducer 12.3 begins to measure the torque starting from a predefined threshold torque. Preferably, the threshold torque is 10% of the nominal torque. The torque transducer 12.3 generates a torque signal MS for the torque measured. Said torque signal MS is transmitted to the evaluation unit 14 via the torque signal line 14.3 schematically shown in FIG. 1 and is imported by the evaluation program 14.1.

In a fifth step VS of the method schematically shown in FIG. 6, the measurement of the angle of rotation is initiated. The angle of rotation is measured by the rotational angle transducer 12.2 starting from a predefined angle starting torque. Preferably, the angle starting torque is 50% of the nominal torque. The rotational angle transducer 12.2 generates a rotational angle signal WS for the angle of rotation measured. The rotational angle signal WS is transmitted to the evaluation unit 14 via the rotational angle signal line 14.2 schematically shown in FIG. 6 and is imported by the evaluation program 14.1.

A sixth step VIS of the method schematically shown in FIG. 6 comprises the determination of whether the set nominal torque is achieved. As soon as the nominal torque is achieved, there is a reaction by the nutrunner 2. The reaction varies depending on the functional principle according to which the nutrunner 2 works. A click-type torque wrench ceases to apply a torque when the nominal torque is reached. An acoustic torque wrench triggers an acoustic or optical signal when the nominal torque is exerted. An indicating nutrunner indicates the nominal torque applied. The reaction of the nutrunner 2 is detected and the braking element 10.1 is deactivated by the control and regulating unit 10.3 schematically shown in FIG. 1. In addition, the measurement of the torque by the torque transducer 12.3 and of the angle of rotation by the rotational angle transducer 12.2 is terminated.

In a seventh step VIIS of the method schematically shown in FIG. 6, the time course of the measured torque signals MS with respect to the measured rotational angle signals WS is graphically represented as torque rates R1, R2, R3. For this purpose, the torque signals MS imported by the evaluation program 14.1 schematically shown in FIG. 1 and imported torque signals WS are graphically displayed on the screen of said evaluation unit 14 as torque rates R1, R2, R3. In order to obtain statistical significance, the screw joint simulation is carried out a plurality of times. The repeatedly measured torque signals MS and rotational angle signals WS are imported by the evaluation program 14.1 and graphically displayed as superimposed torque rates R1, R2, R3.

Figure 7:
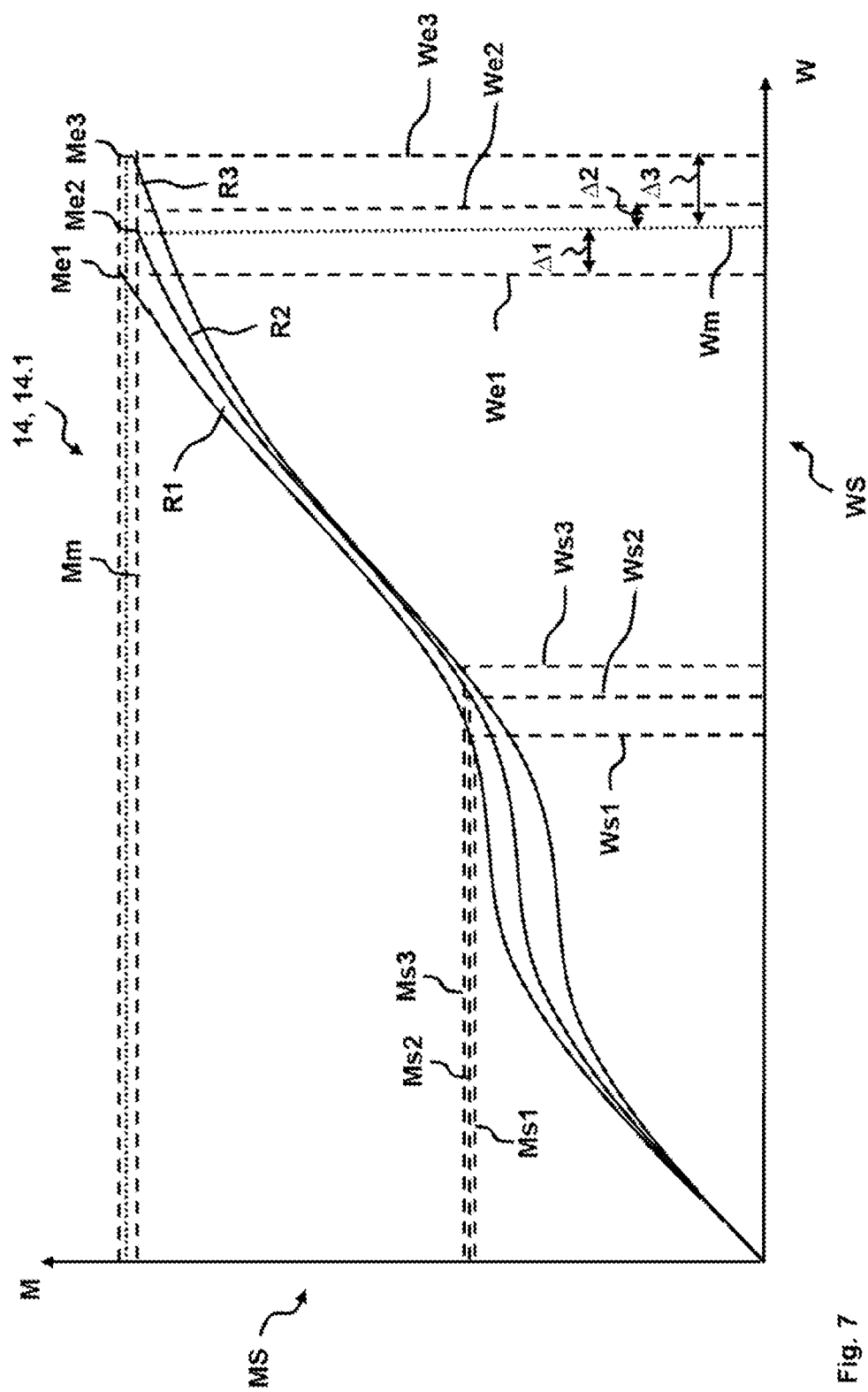
FIG. 7 shows a representation of superimposed torque rates R1, R2, R3 of a screw joint simulation without angle-synchronization using the simulation device 1 according to FIG. 1.
Figure 8:
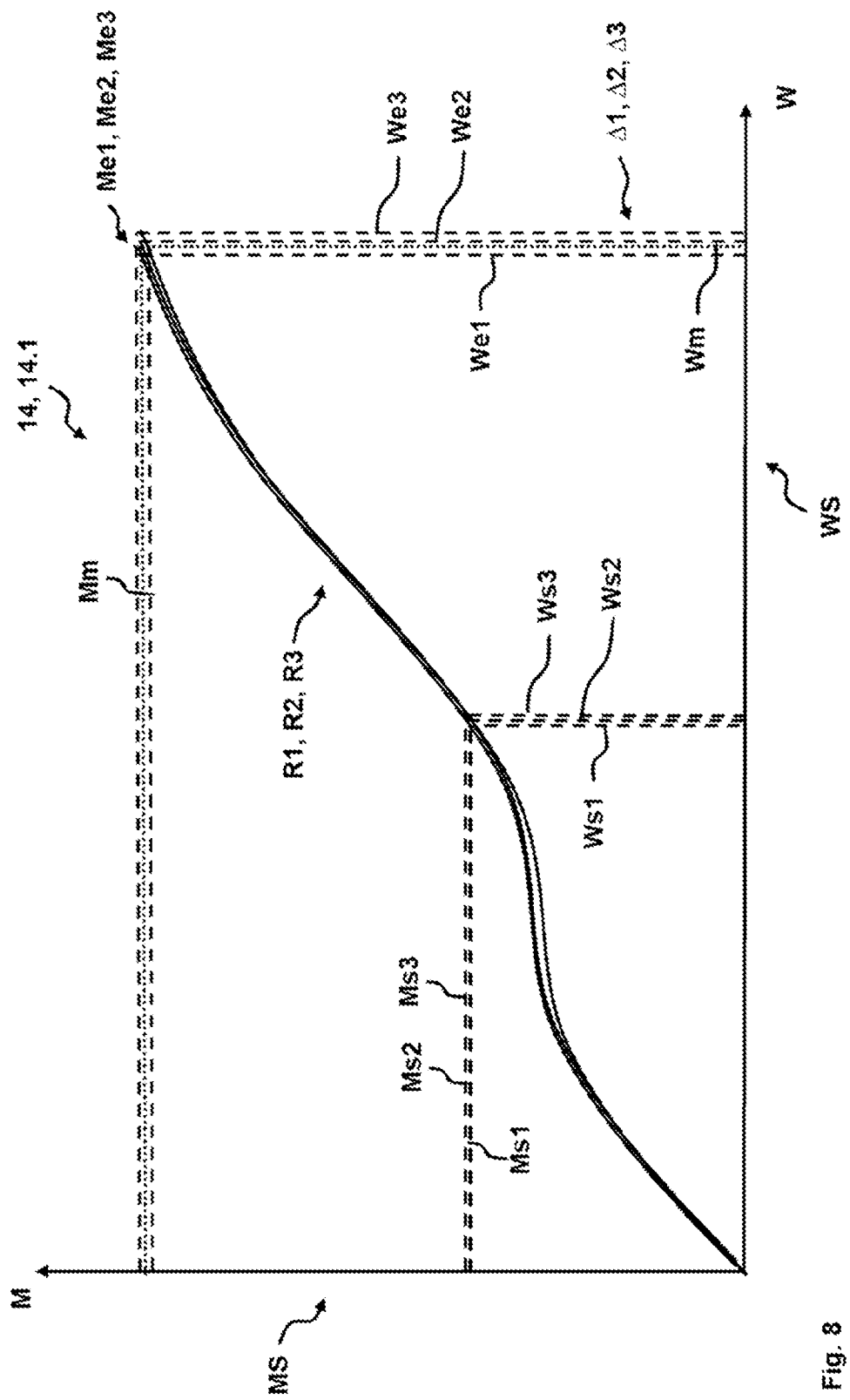
FIG. 8 shows a representation of superimposed torque rates R1, R2, R3 of a screw joint simulation with angle-synchronization using the simulation device 1 according to FIG. 1.

Examples of these superpositions are exemplarily shown in FIGS. 7 and 8. FIG. 7 shows superimposed torque rates R1, R2, R3 of a screw joint simulation using the simulation device 1 without angle-synchronization. Furthermore, FIG. 8 shows superimposed torque rates R1, R2, R3 of a screw joint simulation using the simulation device 1 with angle-synchronization. In the graphs shown, a torque M is plotted as the ordinate and a rotational angle W as the abscissa. Torque signals MS and rotational angle signals WS were measured from the starting torque. For each torque rate R1, R2, R3, measured starting torque signals Ms1, Ms2, Ms3 and measured starting rotational angle signals Ws1, Ws2, Ws3 are represented by dashed lines. In the example, three torque rates R1, R2, R3 are shown in a superimposed manner, however, according to guideline VDI/VDE 2647 of February 2013, 25 torque rates are superimposed per screw joint simulation.

For each torque rate R1, R2, R3, the evaluation program 14.1 is configured to determine a maximum measured torque signal Me1, Me2, Me3 and a maximum measured rotational angle signal We1, We2, We3 that corresponds to the maximum measured torque signal Me1, Me2, Me3. In FIGS. 7 and 8, the maximum measured torque signals Me1, Me2, Me3 are represented by dashed lines. The maximum measured rotational angle signals We1, We2, We3 are also represented by dashed lines in FIGS. 7 and 8.

The evaluation program 14.1 is configured to calculate an arithmetic mean of the maximum measured torque signals Me1, Me2, Me3, and this arithmetic mean is called the mean torque Mm. In FIGS. 7 and 8, the mean torque Mm is represented by a dotted line.

The evaluation programme 14.1 is configured to calculate an arithmetic mean of the maximum measured rotational angle signals We1, We2, We3, said arithmetic mean being referred to as the mean angle of rotation Wm. In FIGS. 7 and 8, the mean angle of rotation Wm is represented by a dotted line.

In the screw joint simulation represented in FIG. 8 that was performed with angle-synchronization, the starting rotational angle signals Ws1, Ws2, Ws3 are much closer to each other than in the screw joint simulation shown in FIG. 7 carried out without angle-synchronization. Furthermore, the maximum measured rotational angle signals We1, We2, We3 are also much closer to each other in the angle-synchronized screw joint simulation shown in FIG. 8 than in the screw joint simulation shown in FIG. 7 without angle-synchronization. The narrower spacing of the starting rotational angle signals Ws1, Ws2, Ws3 to each other and of the maximum measured rotational angle signals We1, We2, We3 to each other is the result of rotational imbalance of the rotating parts of the simulation device 1. In the case of the screw joint simulation that was performed without angle-synchronization, the rotational unbalance occurs in an angularly offset manner. While in the case of the screw joint simulation performed with angle-synchronization the rotational imbalance is angularly synchronized.

Consequently, also the deviations 41, 42, 43 of the maximum measured rotational angle signals We1, We2, We3 from the mean angle of rotation Wm are smaller in the screw joint simulation shown in FIG. 8 that was performed with angle-synchronization than in the screw joint simulation shown in FIG. 7 that was not angle-synchronized. More specifically, the angularly synchronized screw joint simulation complies with the requirements of the guideline VDI/VDE 2647 of February 2013 concerning the permissible deviation of the maximum measured angle of rotation with respect to the mean angle of rotation.

Figure 9:
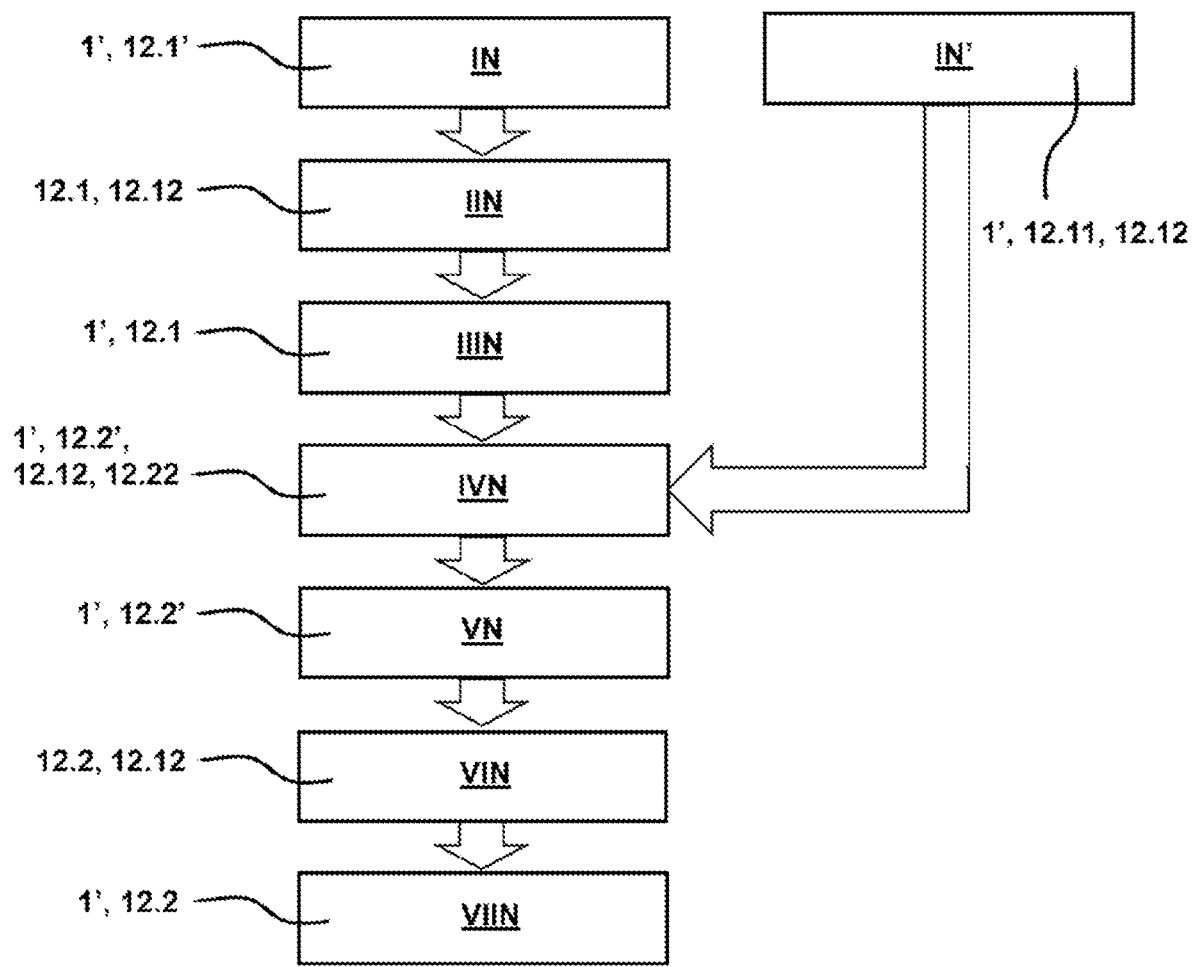
FIG. 9 shows a schematic representation of a sequence of steps IN, IN' to VIIN of the method for retrofitting a pre-existing simulation device 1'.

FIG. 9 shows a schematic representation of a sequence of steps IN, IN' to VIIN of an embodiment of the method for retrofitting a pre-existing simulation device 1'. The pre-existing simulation device 1' comprises a pre-existing rotational angle transducer 12.2' and a pre-existing measuring disc 12.1' without zero mark 12.12.

In a first step IN of the method schematically shown in FIG. 9, the pre-existing measuring disc 12.1' is removed. In a second step IIN of the method, a measuring disc 12.1 having a zero mark 12.12 is provided. In a third step IIIN of the method, the measuring disc 12.1 provided is installed in place of the pre-existing measuring disc 12.1'. In a fourth step IVN of the method, an orientation of the pre-existing rotational angle transducer 12.2' with respect to the zero mark 12.12 is defined as the zero angle 12.22. The replacement of the pre-existing measuring disc 12.1' according to the first steps IN to IVN is useful when the angle marks 12.11 are no clearly defined incremental code values and, thus, none of the incremental code values can be defined to be the zero mark 12.12.

In an alternative first step IN' of the method schematically shown in FIG. 9, one of the angle marks 12.11 of the pre-existing measurement disc 12.1' is defined to be the zero mark 12.12. Afterwards, the fourth step IVN of the method is carried out and an orientation of the pre-existing rotational angle transducer 12.2' with respect to the zero mark 12.12 is defined as the zero angle 12.22. The alternative first step IN' is suitable when the angle marks 12.11 are absolute code values so that one of the absolute code values can be unambiguously defined as the zero mark 12.12.

In the case when the pre-existing rotational angle transducer 12.2' is not designed for measuring a zero mark 12.12, the pre-existing rotational angle transducer 12.2' is removed in a fifth step VN of the method schematically shown in FIG. 9. In a sixth step VIN of the method, a rotational angle transducer 12.2 configured to measure the zero mark 12.12 is provided. Furthermore, in a seventh step VIIN of the method, the rotational angle transducer 12.2 provided is installed in place of the pre-existing rotational angle transducer 12.2'. The replacement of the pre-existing rotational angle transducer 12.2' after steps VN to VIIN is useful when the pre-existing rotational angle transducer 12.2' is not designed for measuring the zero mark 12.12, for example because the zero mark 12.12 and the angle marks 12.11 are arranged separately from each other on the measuring surface 12.10.

LIST OF REFERENCE NUMERALS

1' pre-existing simulation device
2 nutrunner
10 brake unit
10.0 brake unit housing
10.1 braking element
10.2 rotor
10.3 control and regulating unit
11 coupling element
12 measuring unit
12.0 measuring unit housing
12.1 measuring disc
12.1' pre-existing measuring disc
12.10 measuring surface
12.11 angle mark
12.12 zero mark
12.2 rotational angle transducer
12.2' pre-existing rotational angle transducer
12.21 sensor element
12.22 zero angle
12.3 torque transducer
13 test connecting element
14 evaluation unit
14.1 evaluation program
14.2 rotational angle signal line
14.3 torque signal line
Δ1, Δ2, Δ3 deviation
IN-VIIN step of the method for retrofitting a pre-existing simulation device
IS-VIIS step of the method for carrying out the screw joint simulation
M torque
Me1, Me2, Me3 maximum torque Mm mean torque
Ms1, Ms2, Ms3 starting torque signal
MS torque signal
NS zero mark signal
R1, R2, R3 torque rate
W angle of rotation
We1, We2, We3 maximum angle of rotation
Ws1, Ws2, Ws3 starting rotational angle signal
Wm mean angle of rotation
Z axis of rotation

What is claimed is:

1. A simulation device for the screw joint simulation of a nutrunner, the simulation device comprising:
a test connecting element configured to be coupled to the nutrunner during activation of the nutrunner about an axis of rotation to receive a torque exerted onto the test connecting element;
a brake unit rigidly connected to the test connecting element, wherein the brake unit is configured and disposed so that activation of the brake unit brakes the test connecting element rotating about the axis of rotation;
a torque transducer configured for measuring the torque exerted on the test connecting element by the nutrunner;
a rotational angle transducer configured for measuring an angle of rotation about which the test connecting element rotates about the axis of rotation; and
a zero mark coupled to the test connecting element; and
wherein the brake unit is configured to be orientated at a zero angle with respect to the zero mark.

2. The simulation device according to claim 1, further comprising a measuring disc that is coupled to the test connecting element and carries the zero mark.

3. The simulation device according to claim 2, wherein the measuring disc is disposed between brake unit and test connecting element in the direction of the axis of rotation;
wherein the measuring disc is rigidly connected to the brake unit;
wherein the test connecting element is rigidly connected to the measuring disc; and
wherein the measuring disc defines a measuring surface on which the zero mark is disposed.

4. The simulation device according to claim 3, wherein the measuring disc includes a plurality of angle marks arranged on the measuring surface; and
wherein the zero mark is disposed spatially separated in a direction perpendicular to the rotational axis from the plurality of angle marks on the measuring surface.

5. The simulation device according to claim 3, wherein each of the plurality of angle marks is defined by one of a plurality of incremental code values.

6. The simulation device according to claim 3, wherein a plurality of angle marks is disposed on the measuring surface; and
wherein the zero mark and the angle marks in the plurality of angle marks are not spatially separated from each other on the measuring surface.

7. The simulation device according to claim 3, wherein the angle marks are absolute code values.

8. The simulation device according to claim 1, wherein the rotational angle transducer is arranged in a defined manner at a zero angle with respect to the zero mark.

9. The simulation device according to claim 1, further comprising a housing, wherein the rotational angle transducer is mounted in a fixed position with respect to the housing.

10. The simulation device according to claim 1, wherein the rotational angle transducer includes a sensor element that is configured to detect the zero mark adjusted to the zero angle; and
wherein the rotational angle transducer is configured to generate a zero mark signal for a zero mark detected by the sensor element.

11. A method for carrying out a screw joint simulation of a nutrunner, which is rotatable about a rotational axis, using a simulation device that includes a test connecting element, a brake unit, a torque transducer, a rotational angle transducer, and a zero mark, the method comprising the following steps:
adjusting the brake unit to a zero angle with respect to the zero mark;
coupling the nutrunner to the test connecting element; and
initiating the screw joint simulation starting from the zero angle.

12. A method for retrofitting a pre-existing simulation device for the screw joint simulation of a nutrunner that is configured for screw-tightening rotation about a rotational axis, wherein the pre-existing simulation device includes a pre-existing rotational angle transducer and a pre-existing measuring disc, the method comprising the following steps:
removing the pre-existing measuring disc;
installing in the pre-existing simulation device, a measuring disc that carries on a measuring surface thereof, a zero mark; and
defining as a zero angle, an orientation of the pre-existing rotational angle transducer with respect to the zero mark.

13. The method according to claim 12, further comprising the step of installing in the pre-existing simulation device, a rotational angle transducer configured for measuring the zero mark.

14. The method according to claim 12, wherein the measuring disc that is installed in the pre-existing simulation device carries on the measuring surface a plurality of angle marks that are spaced apart from the zero mark in a direction that is perpendicular to the rotational axis; and
installing in the pre-existing simulation device, a rotational angle transducer that includes a sensor element that is configured to detect the zero mark.

* * * * *